United States Patent
Nilsson et al.

(10) Patent No.: US 10,075,209 B2
(45) Date of Patent: Sep. 11, 2018

(54) RADIO SYSTEM ANTENNA CONNECTOR ARRANGEMENT

(71) Applicant: TELEFONAKTIEBOLAGET L M ERICSSON (PUBL), Stockholm (SE)

(72) Inventors: Tobias Nilsson, Mölndal (SE); Göran Nilsson, Hisings Backa (SE); Robert Lindgren, Västra Frölunda (SE); Ove Persson, Hunnebostrand (SE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 14/893,299

(22) PCT Filed: Nov. 16, 2015

(86) PCT No.: PCT/EP2015/076720
§ 371 (c)(1),
(2) Date: Nov. 23, 2015

(87) PCT Pub. No.: WO2017/084695
PCT Pub. Date: May 26, 2017

(65) Prior Publication Data
US 2018/0062695 A1     Mar. 1, 2018

(51) Int. Cl.
*H04B 1/525*     (2015.01)
*H01P 1/383*     (2006.01)

(52) U.S. Cl.
CPC .............. *H04B 1/525* (2013.01); *H01P 1/383* (2013.01)

(58) Field of Classification Search
CPC ... H04B 1/10; H04B 1/18; H04B 1/44; H04B 1/383; H04B 1/005; H04B 1/525; H04B 1/109; H04B 1/0064; H04B 1/1036; H04B 1/0458; H04B 1/0475; H04L 5/14; H04L 5/1461
See application file for complete search history.

(56) References Cited

U.S. PATENT DOCUMENTS

| | | |
|---|---|---|
| 2006/0229030 A1 | 10/2006 | Simon et al. |
| 2014/0194074 A1 | 7/2014 | Klomsdorf et al. |

(Continued)

FOREIGN PATENT DOCUMENTS

WO     2008048534 A1     4/2008

*Primary Examiner* — Thanh Le

(57) ABSTRACT

The present disclosure relates to a radio system comprising an antenna device, an antenna connector arrangement and a radio transceiver with a transmitter branch and a receiver branch. The antenna connector arrangement connects the antenna device to the transmitter branch and to the receiver branch, and comprises a first tuneable band-stop filter, a second tuneable band-stop filter and a three-way-junction. The first tuneable band-stop filter is connected to the transmitter branch and a transmitter input port of the three-way-junction to filter radio signals, and the second tuneable band-stop filter is connected to the receiver branch and a receiver output port of the three-way-junction to filter radio signals. The three-way-junction comprises a first antenna port that is connected to the antenna device. The present disclosure also relates to an antenna connector arrangement, an antenna arrangement, and an electrically tuneable waveguide band-stop filter arrangement.

29 Claims, 3 Drawing Sheets

(56) References Cited

U.S. PATENT DOCUMENTS

2014/0313947 A1* 10/2014 Ali-Ahmad ............ H04B 1/525
                                                                370/278
2015/0171903 A1    6/2015 Mehlman et al.
2015/0303892 A1* 10/2015 Desclos .................. H03H 7/18
                                                                333/132
2017/0126202 A1*  5/2017 Shapoury ............ H01P 1/20381
2018/0005966 A1*  1/2018 Smith ...................... H03H 7/12

* cited by examiner

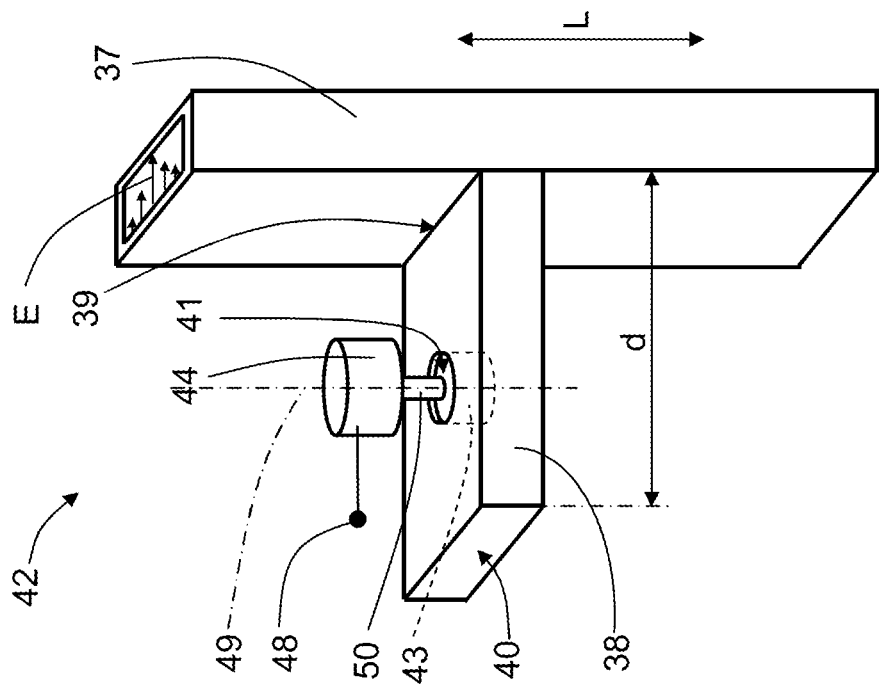
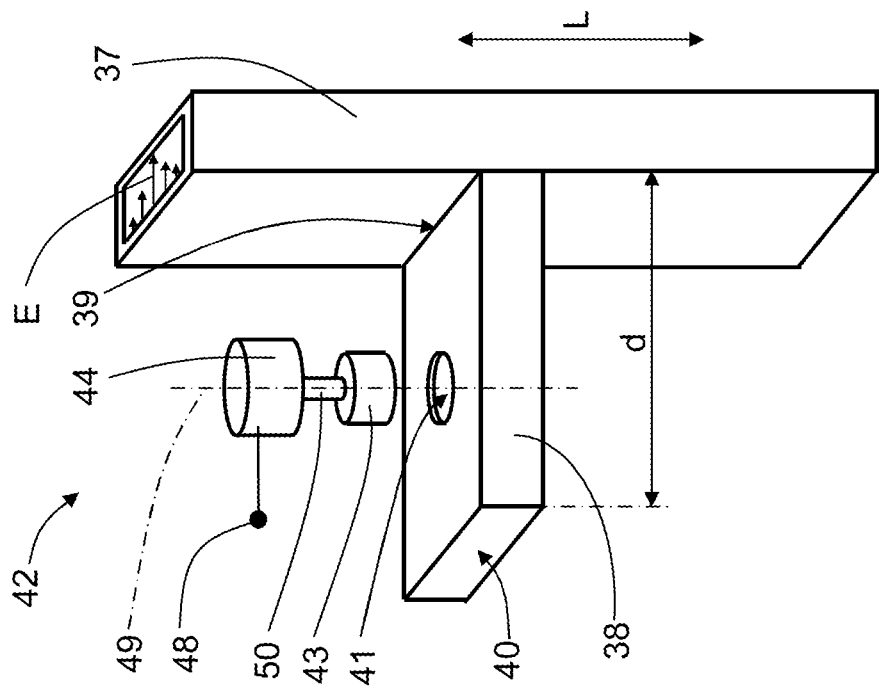

US 10,075,209 B2

RADIO SYSTEM ANTENNA CONNECTOR ARRANGEMENT

TECHNICAL FIELD

The present disclosure relates to a radio system comprising a radio transceiver, an antenna device and an antenna connector arrangement. The radio transceiver comprises a transmitter branch and a receiver branch for transmitting and receiving, respectively, radio signals via the antenna device.

BACKGROUND

In wireless communication networks, there are communication nodes, for example microwave link nodes. Microwave link nodes normally comprise microwave link antenna devices, where a microwave link antenna arrangement normally is connected to a radio branch for transmission, a transmission branch, via the antenna device, and a radio branch for reception, a reception branch, via the antenna device.

A microwave link antenna device is usually connected to a transmission branch and a reception branch via a diplexer arrangement that comprises a first band-pass filter that is connected to the reception branch and a second band-pass filter that is connected to the transmission branch. A three-port junction connects the transmit and receive branches to the antenna device.

Such a diplexer is relatively expensive to manufacture, and constitutes a quite space-consuming component. Furthermore, microwave links are manufactured and sold for many different frequency bands, and it is necessary to have one specific diplexer per frequency band, due to the frequency dependency of components.

There is thus a need for a less complicated and more compact diplexer arrangement and radio system, in particular regarding a transition between, on one hand, a transmission branch and a reception branch, and, on the other hand, an antenna device.

SUMMARY

It is an object of the present disclosure to provide a less complicated and more compact diplexer arrangement than what has been described in prior art; in particular regarding a transition between, on one hand, a transmission branch and a reception branch, and, on the other hand, an antenna device.

Said object is obtained by means of a radio system comprising a radio transceiver, an antenna device and an antenna connector arrangement. The radio transceiver comprises a transmitter branch and a receiver branch for transmitting and receiving, respectively, radio signals via the antenna device, and the antenna connector arrangement connects the antenna device to the transmitter branch and to the receiver branch. The antenna connector arrangement comprises a first tuneable band-stop filter, a second tuneable band-stop filter and a three-way-junction. The first tuneable band-stop filter is connected to the transmitter branch and a transmitter input port of the three-way-junction to filter radio signals, and the second tuneable band-stop filter is connected to the receiver branch and a receiver output port of the three-way-junction to filter radio signals. The three-way-junction comprises a first antenna port that is connected to the antenna device.

Said object is also obtained by means of an antenna connector arrangement that is adapted to connect an antenna device to a transmitter branch and to a receiver branch of a radio transceiver. The transmitter branch and the receiver branch are adapted for transmitting and receiving, respectively, radio signals via the antenna device. The antenna connector arrangement comprises a first tuneable band-stop filter, a second tuneable band-stop filter and a three-way-junction. The first tuneable band-stop filter is connected to the transmitter branch and a transmitter input port of the three-way-junction to filter radio signals, and the second tuneable band-stop filter is connected to the receiver branch and a receiver output port of the three-way-junction to filter radio signals. The three-way-junction comprises a first antenna port that is connected to the antenna device.

Said object is also obtained by means of an antenna arrangement comprising an antenna device and an antenna connector arrangement, where the antenna connector arrangement is adapted to connect an antenna device to a transmitter branch and a receiver branch of a radio transceiver. The transmitter branch and the receiver branch are adapted for transmitting and receiving, respectively, radio signals via the antenna device. The antenna connector arrangement comprises a first tuneable band-stop filter, a second tuneable band-stop filter and a three-way-junction. The first tuneable band-stop filter is connected to the transmitter branch and a transmitter input port of the three-way-junction to filter radio signals, and the second tuneable band-stop filter is connected to the receiver branch and a receiver output port of the three-way-junction to filter radio signals. The three-way-junction comprises a first antenna port that is connected to the antenna device.

According to an example, each of the first tuneable band-stop filter and the second tuneable band-stop filter comprises only one filter pole.

According to another example, the first tuneable band-stop filter is adapted to suppress radio signals within a first frequency band corresponding to a frequency band of radio signals received via the receiver branch. Furthermore, the second tuneable band-stop filter is adapted to suppress radio signals within a fourth frequency band corresponding to a frequency band of radio signals transmitted via the transmitter branch.

According to another example, the first tuneable band-stop filter and the second tuneable band-stop filter are constituted by electrically tuneable band-stop filters.

According to another example, the three-way-junction is constituted by a circulator.

According to another example, wherein the receiver branch comprises a first amplifier arrangement, a second oscillator, a second mixer, a receiver filter and an analogue to digital converter (ADC). The first amplifier arrangement is arranged to amplify a received first analogue signal at the first frequency band that is input from the second tuneable band-stop filter, and the second mixer is arranged to shift the amplified first analogue signal down in frequency to a second analogue signal within a second frequency band. The first ADC is arranged to convert the second analogue signal to a received first digital signal. where the receiver branch further comprises a signal subtractor connected to the first ADC. The signal subtractor is used for interference cancellation.

According to another example, the transmitter branch comprises a digital to analogue converter (DAC), a first oscillator connected to a first mixer and a second amplifier arrangement that in turn is connected to a coupler. The DAC is arranged to convert an input second digital signal to a third analogue signal within a third frequency band, and the first mixer is arranged to shift the third analogue signal up in frequency to a fourth analogue signal within a fourth frequency band.

According to another example, the radio transceiver is in the form of a homodyne radio transceiver.

It is also an object of the present disclosure to provide an electrically tuneable waveguide band-stop filter arrangement that is suitable as a tuneable band-stop filter according to the above.

This object is obtained by means of an electrically tuneable waveguide band-stop filter arrangement comprising a first waveguide part running along a longitudinal extension and at least one second waveguide part that is connected to the first waveguide part along its longitudinal extension at a waveguide connection. Said second waveguide part runs parallel to the extension of the electrical field of the first waveguide part and ends in a short-circuit a certain distance from the waveguide connection. Said second waveguide part comprises an aperture, and the band-stop filter arrangement further comprises a dielectric part and an electric motor. The dielectric part is arranged to enter said second waveguide part via the aperture, and the electric motor is arranged to move the dielectric part within said second waveguide part via the aperture.

According to an example, the electric motor comprises a control connection that is adapted to enable tuning of the filter characteristics of the band-stop filter arrangement.

According to another example, the electric motor is constituted by a step-motor that is arranged to move the dielectric part within said second waveguide part along an adjustment axis by means of a screw rod that runs along the adjustment axis.

More examples are disclosed in the dependent claims.

A number of advantages are obtained by means of the present disclosure. Mainly, a less complicated and more compact radio system than what has been described in prior art is provided. This is with regard to in particular a transition between, on one hand, a transmission branch and a reception branch, and, on the other hand, an antenna device.

Less complicated filters may be used, and this of course brings less expensive components. Since the band-stop filters are tuneable, one type of antenna connector arrangement according the above may be used for several radio frequency bands.

Furthermore, this enables a possible integration of the diplexer. Different variants may be provided as different antenna connector arrangements, but the present disclosure also enables different variants to be provided as different antenna arrangements, including the antenna device.

BRIEF DESCRIPTION OF THE DRAWINGS

The present disclosure will now be described more in detail with reference to the appended drawings, where:

FIG. 2 shows a first schematic view of an electrically tuneable waveguide band-stop filter arrangement;

FIG. 3 shows a second schematic view of an electrically tuneable waveguide band-stop filter arrangement.

DETAILED DESCRIPTION

Figure 1:
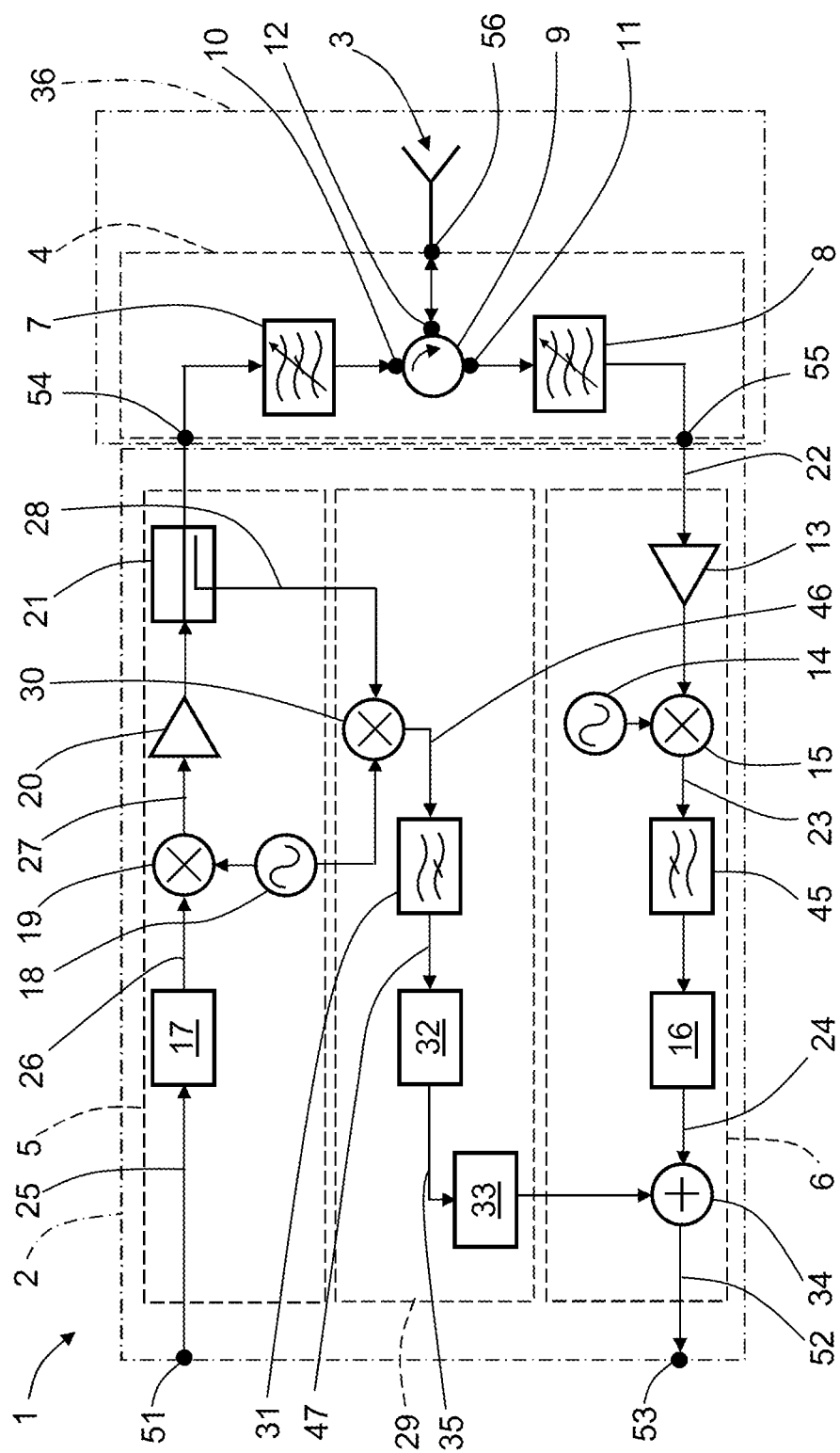
FIG. 1 shows simplified schematics of a first example of a radio system.

With reference to FIG. 1, showing a simplified schematics of a first example of a radio system, the radio system 1 comprises a homodyne radio transceiver 2 and an antenna device 3, where the radio transceiver 2 comprises a transmitter branch 5 and a receiver branch 6 for transmitting and receiving, respectively, radio signals via the antenna device 3.

The receiver branch 6 comprises a first amplifier arrangement 13, a second oscillator 14, a second mixer 15, a receiver filter 45 and an analogue to digital converter 16 (ADC). The first amplifier arrangement 13 is arranged to amplify a received first analogue signal 22 at a first frequency band $f_1$, constituting a reception frequency band, the second mixer 15 is arranged to shift the amplified first analogue signal down in frequency to a second analogue signal 23 within a second frequency band $f_2$, and the first ADC 16 is arranged to convert the second analogue signal 23 to a received first digital signal 24 after having been filtered at the receiver filter 45. The second oscillator 14 is connected to the second mixer 15, providing it with a suitable mixing frequency. The receiver filter 45 is adapted for suppressing undesired signals from the second mixer 15 such as undesired harmonics. According to some aspects the receiver filter 45 also provides an anti-aliasing function in support of the ADC. The receiver branch 6 also comprises a signal subtractor 34 that is connected to the first ADC 16 and into which the first digital signal 24 is fed. The signal subtractor 34 will be discussed more in detail below.

The transmitter branch 5 comprises a digital to analogue converter 17 (DAC), a first oscillator 18 connected to a first mixer 19 and a second amplifier arrangement 20 that in turn is connected to a coupler 21. The DAC 17 is arranged to convert an input second digital signal 25, being input at an input terminal 51, to a third analogue signal 26 within a third frequency band $f_3$. The first mixer 19 is arranged to shift the third analogue signal 26 up in frequency to a fourth analogue signal 27 within a fourth frequency band $f_4$, constituting a transmission frequency band. The first oscillator 18 is connected to the first mixer 19, providing it with a suitable mixing frequency.

The space between the reception frequency band and the transmission frequency band is called duplex distance. Signals within the transmission frequency band $f_4$ are not wanted in signals within the reception frequency band $f_1$, since these constitute undesired interference. How this is counteracted in this example will be described below.

The coupler 21 is arranged to feed a first coupled signal 28 within the fourth frequency band $f_4$, that is constituted by a fraction of the fourth analogue signal 27, to an interference cancellation arrangement 29 comprised in the radio transceiver 2. The interference cancellation arrangement 29 comprises a third mixer 30 that is arranged to shift the first coupled signal 28 down in frequency to a second coupled signal 46 within the third frequency band $f_3$, an anti-aliasing filter 31, a second ADC 32 and a digital signal processor 33 (DSP). The ADC 32 is arranged to convert the filtered second coupled signal 47 to a digital coupled signal 35, while the DSP 33 and the signal subtractor 34 are arranged to subtract the digital coupled signal 35 from the received first digital signal 24. A resulting digital output signal 52 is output at an output terminal 53.

The DSP 33 is arranged to prepare the digital coupled signal 35, the signal subtractor 34 being arranged to produce the resulting digital output signal 52 by subtracting the output from the DSP 33 from the first digital signal 24. Alternatively, the DSP 33 may also be arranged to additionally produce a phase shift of 180° such that the signal subtractor 34 is arranged to produce the resulting digital output signal 52 by adding the output from the DSP 33 to the first digital signal 24. The term "signal subtractor" thus relates to a desired total functionality, while the component itself may be arranged for adding a signal, as mentioned above.

The interference cancellation arrangement 29 is thus mainly used for removing components of the fourth analogue signal 27 that have leaked into the receiver branch 6. In other words, components of the fourth analogue signal 27, being within the fourth frequency band $f_4$, and having been processed via the second mixer 15 and the first ADC 16 are removed from the first digital signal 24.

According to the present disclosure, the radio system 1 comprises an antenna connector arrangement 4 that connects the antenna device 3 to the transmitter branch 5 and to the receiver branch 6. The antenna connector arrangement 4 comprises a first tuneable band-stop filter 7, a second tuneable band-stop filter 8 and a circulator 9 that in turn comprises a first antenna port 12 that is connected to the antenna device 3. The first tuneable band-stop filter 7 is connected to the transmitter branch 5 and a transmitter input port 10 of the circulator 9 to filter radio signals, and the second tuneable band-stop filter 8 is connected to the receiver branch 6 and a receiver output port 11 of the circulator 9 to filter radio signals.

The fourth analogue signal 27 that has been amplified and having passed the coupler 21 is input to the first tuneable band-stop filter 7 via a first antenna connector port 54. The received first analogue signal 22 is input to the first amplifier arrangement 13 from the second tuneable band-stop filter 8 via a first antenna connector port 55.

Each of the first tuneable band-stop filter 7 and the second tuneable band-stop filter 8, according to some aspects, comprises only one filter pole. The first tuneable band-stop filter 7 is adapted to suppress radio signals within the first frequency band $f_1$ corresponding to a frequency band of radio signals received via the receiver branch 6, and the second tuneable band-stop filter 8 is adapted to suppress radio signals within the fourth frequency band $f_4$ corresponding to a frequency band of radio signals transmitted via the transmitter branch 5.

According to some aspects, the first tuneable band-stop filter 7 is adapted to suppress radio signals within the first frequency band $f_1$ by a suppression in a first suppression range between 15 dB and 25 dB, and the second tuneable band-stop filter 8 is adapted to suppress radio signals within the fourth frequency band $f_4$ by a suppression in a second suppression range between 15 dB and 25 dB.

Herein, by suppression is meant reduction of signal amplitude or power. Suppression by 15 dB means that an input signal is 15 dB stronger in terms of power in dBm than an output signal.

The antenna device 3, according to some aspects, comprises a directive antenna, such as a microwave radio-link antenna. The antenna device 3, according to some aspects, comprises one or more separate antennas, each antenna being in the form of a reflector antenna or an array antenna.

The antenna connector arrangement 4 is connected to the antenna device via a second antenna port 56, the first antenna port 12 being connected to the second antenna port 56. According to some aspects, the antenna connector arrangement 4 and the antenna device 3 are comprised in an antenna arrangement 36.

With reference to FIG. 2 and FIG. 3, an electrically tuneable waveguide band-stop filter arrangement 42 that may be used for at least one of the first tuneable band-stop filter 7 and the second tuneable band-stop filter 8 will be described.

The electrically tuneable waveguide band-stop filter arrangement 42 comprises a first waveguide part 37 running along a longitudinal extension L and a second waveguide part 38 that is connected to the first waveguide part 37 along its longitudinal extension L at a waveguide connection 39. The second waveguide part 38 runs parallel to the extension of an electrical field E of the first waveguide part 37 and ends in a short-circuit 40 a certain distance d from the waveguide connection 39.

The second waveguide part 38 comprises an aperture 41, and the band-stop filter arrangement 42 further comprises a dielectric part 43 and an electric motor 44, where the dielectric part 43 is arranged to enter the second waveguide part 38 via the aperture 41. The electric motor 44 is arranged to move the dielectric part 43 within the second waveguide part 38 via the aperture 41.

In FIG. 2, the dielectric part 43 and the electric motor 44 are shown removed from the second waveguide part 38 for presenting a clear view. In FIG. 3, the dielectric part 43 and the electric motor 44 are shown mounted in the second waveguide part 38.

Suitably, the electric motor 44 comprises a control connection 48 that is adapted to enable tuning of the filter characteristics of the band-stop filter arrangement 42. The electric motor 44 may then be constituted by a step-motor that is arranged to move the dielectric part 43 within the second waveguide part 38 along an adjustment axis 49 by means of a screw rod 50 that runs along the adjustment axis 49.

In this example, there is only one second waveguide part 38, since the electrically tuneable waveguide band-stop filter arrangement 42 described comprises only one filter pole. For a case where an electrically tuneable waveguide band-stop filter arrangement comprises more than one filter pole, the electrically tuneable waveguide band-stop filter arrangement would comprise more than one second waveguide part 38. The electrically tuneable waveguide band-stop filter arrangement 42 thus comprises at least one second waveguide part 38.

The second waveguide part 38 is electrically connected to the first waveguide part 37 along its longitudinal extension L at the waveguide connection 39. In this context, the term electrically connected means that mat least a part of the electromagnetic energy propagating in the first waveguide part 37 is enabled to propagate in the second waveguide part 38.

An electrical connection often means that a signal conductor and a ground conductor of two different conductors are mutually connected in a galvanic manner. For a waveguide being in the form of a tube with metal walls, electromagnetic energy mostly propagate within the waveguide; due to skin effect at high frequencies, electric current along the walls penetrates typically only a few micrometers into the metal walls. A waveguide connection functioning as an electrical connection is normally in the form of an opening between a first waveguide and a second waveguide, through which opening electromagnetic energy may propagate between the first waveguide and the second waveguide. The first waveguide and the second waveguide should then be mounted to each other such that their walls are in electrical contact with each other, preferably such that no electromagnetic energy may leak out at the waveguide connection. The terms "connected to" and "connection" is thus according to some aspects equivalent to the terms "electrically connected to" and "electrical connection".

Such waveguide connections are apparent in several positions in the examples described, for example between the circulator 9 and the first tuneable band-stop filter 7, between the circulator 9 and the second tuneable band-stop filter 8, and between the circulator 9 and the antenna device 3. This follows from that the first tuneable band-stop filter 7 is connected to the transmitter input port 10 of the circulator 9, the second tuneable band-stop filter 8 is connected to the receiver output port 11 of the circulator 9, and that the circulator 9 comprises a first antenna port 12 that is connected to the antenna device 3.

Due to the skin effect mentioned, the waveguide parts used do not have to be made entirely of an electrically conducting material, but may for example be made in a plastic material that at least partially is covered with an electrically conductive coating.

The present disclosure is not limited to the above, but may vary within the scope of the appended claims. For example, it is conceivable that the radio transceiver 2 is not of a homodyne type, but of a heterodyne type, having one IF (Intermediate Frequency) or several IF:s in a previously known manner.

Figure 4:
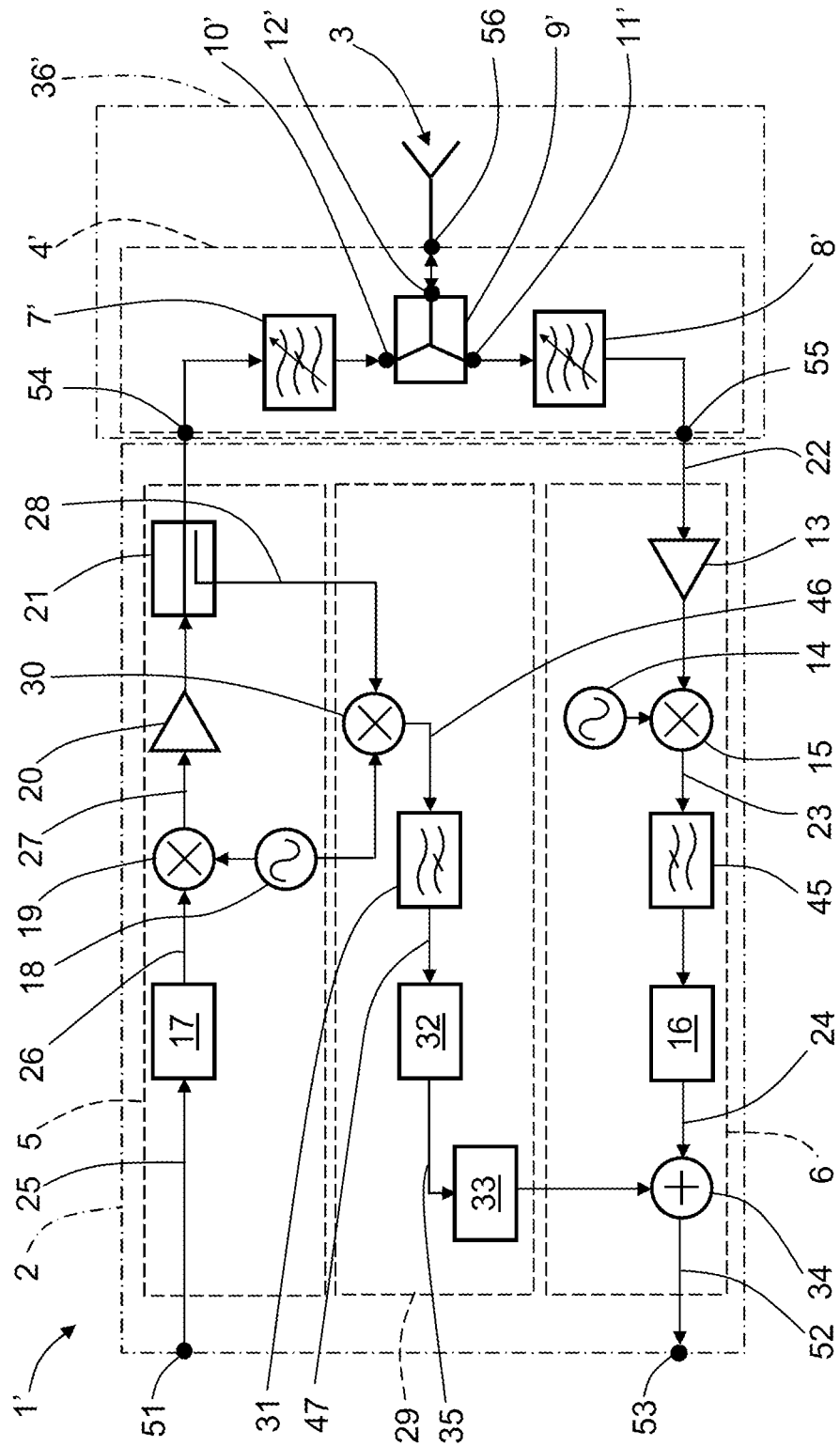
FIG. 4 shows simplified schematics of a second example of a radio system.

Generally, any type of suitable three-way junction may be used for connecting the first tuneable band-stop filter 7 and the second tuneable band-stop filter 8 to the antenna device 3. For example, with reference to FIG. 4 that corresponds to FIG. 1 and shows simplified schematics of a second example of a radio system 1', there is a first tuneable band-stop filter 7', a second tuneable band-stop filter 8, and a three-way-junction 9' comprised in an antenna connector arrangement 4'.

The first tuneable band-stop filter 7' is connected to the transmitter branch 5 and a transmitter input port 10' of the three-way-junction 9' to filter radio signals, and the second tuneable band-stop filter 8' is connected to the receiver branch 6 and a receiver output port 11' of the three-way-junction 9'. The three-way-junction 9' comprises a first antenna port 12' that is connected to the antenna device 3.

According to some aspects, the antenna connector arrangement 4' and the antenna device 3 are comprised in an antenna arrangement 36' as in the first example.

The general three-way junction 9' can of course be constituted by the previously discussed circulator 9, but many other alternatives are possible. For example a three port waveguide T-junction or a 120 degree junction.

According to some aspects, if a circulator is not used as a three-way junction, each of the first tuneable band-stop filter 7' and the second tuneable band-stop filter 8' comprises more than one filter pole. A possible configuration of a tuneable band-stop filter that comprises more than one filter pole has been mentioned above in the example with reference to FIG. 2 and FIG. 3.

The suppression ranges mentioned for the first tuneable band-stop filter 7 and the second tuneable band-stop filter 8 are only examples, any suitable range may be used.

The first tuneable band-stop filter 7 and the second tuneable band-stop filter 8 should at least be tuneable. According to an aspect, the first tuneable band-stop filter 7 and the second tuneable band-stop filter 8 are be electrically tuneable. According to another aspect, the first tuneable band-stop filter 7 and the second tuneable band-stop filter 8 are manually tuneable.

The dielectric part 43 is shown to have a cylindrical appearance. Many other shapes are of course conceivable, and the dielectric part 43 may be constituted by two or more different dielectric materials. The electric motor 44 may be adapted to control the position of the dielectric part 43 in many other ways; for example the electric motor 44 may be in the form of a linear motor.

The radio system 1 shown is to be regarded as simplified in order to enable an uncomplicated description of the present disclosure; normally a radio system comprises several additional components, for example in the interference cancellation arrangement 29. All such possible additional components are of course very well known in the art.

When terms like parallel are used, these terms are not to be interpreted as mathematically exact, but within what is practically obtainable.

Generally, the present disclosure relates to a radio system 1 comprising a radio transceiver 2, an antenna device 3 and an antenna connector arrangement 4, where the radio transceiver 2 comprises a transmitter branch 5 and a receiver branch 6 for transmitting and receiving, respectively, radio signals via the antenna device 3, and where the antenna connector arrangement 4 connects the antenna device 3 to the transmitter branch 5 and to the receiver branch 6. The antenna connector arrangement 4 comprises a first tuneable band-stop filter 7, 7', a second tuneable band-stop filter 8, 8' and a three-way-junction 9, 9', where the first tuneable band-stop filter 7, 7' is connected to the transmitter branch 5 and a transmitter input port 10, 10' of the three-way-junction 9, 9' to filter radio signals, and where the second tuneable band-stop filter 8, 8' is connected to the receiver branch 6 and a receiver output port 11, 11' of the three-way-junction 9, 9' to filter radio signals, where the three-way-junction 9, 9' comprises a first antenna port 12, 12' that is connected to the antenna device 3.

According to an example, each of the first tuneable band-stop filter 7 and the second tuneable band-stop filter 8 comprises only one filter pole.

According to an example, the first tuneable band-stop filter 7 is adapted to suppress radio signals within a first frequency band $f_1$ corresponding to a frequency band of radio signals received via the receiver branch 6, and wherein the second tuneable band-stop filter 8 is adapted to suppress radio signals within a fourth frequency band $f_4$ corresponding to a frequency band of radio signals transmitted via the transmitter branch 5.

According to an example, the first tuneable band-stop filter 7 is adapted to suppress radio signals within the first frequency band $f_1$ by a suppression in a first suppression range between 15 dB and 25 dB, and wherein the second tuneable band-stop filter 8 is adapted to suppress radio signals within the fourth frequency band $f_4$ by a suppression in a second suppression range between 15 dB and 25 dB.

According to an example, the receiver branch 6 comprises a first amplifier arrangement 13, a second oscillator 14, a second mixer 15, a receiver filter 45 and an analogue to digital converter (ADC) 16, where the first amplifier arrangement 13 is arranged to amplify a received first analogue signal 22 at the first frequency band $f_1$ that is input from the second tuneable band-stop filter 8, the second mixer 15 is arranged to shift the amplified first analogue signal down in frequency to a second analogue signal 23 within a second frequency band $f_2$, and where the first ADC 16 is arranged to convert the second analogue signal 23 to a received first digital signal 24, where the receiver branch 6 further comprises a signal subtractor 34 connected to the first ADC 16.

According to an example, the transmitter branch 5 comprises a digital to analogue converter (DAC) 17, a first oscillator 18 connected to a first mixer 19 and a second amplifier arrangement 20 that in turn is connected to a coupler 21, where the DAC 17 is arranged to convert an input second digital signal 25 to a third analogue signal 26 within a third frequency band $f_3$, and where the first mixer 19 is arranged to shift the third analogue signal 26 up in frequency to a fourth analogue signal 27 within a fourth frequency band $f_4$.

According to an example, the coupler 21 is arranged to feed a first coupled signal 28 within the fourth frequency band $f_4$ that is constituted by a fraction of the fourth analogue signal 27 to an interference cancellation arrangement 29 comprised in the radio transceiver 2.

According to an example, the interference cancellation arrangement 29 comprises a third mixer 30 that is arranged to shift the first coupled signal 28 down in frequency to a second coupled signal 46 within the third frequency band $f_3$, an anti-aliasing filter 31, a second analogue to digital converter (ADC) 32 and a digital signal processor (DSP) 33, where the ADC 32 is arranged to convert the filtered second coupled signal 47 to a digital coupled signal 35, and where the DSP 33 and the signal subtractor 34 are arranged to subtract the digital coupled signal 35 from the received first digital signal 24.

According to an example, the radio transceiver 2 is in the form of a homodyne radio transceiver.

According to an example, the first tuneable band-stop filter 7 and the second tuneable band-stop filter 8 are constituted by electrically tuneable band-stop filters 7, 8.

According to an example, the antenna device 3 comprises a directive antenna.

According to an example, the antenna device 3 comprises a microwave radio-link antenna.

According to an example, the three-way-junction is constituted by a circulator 9.

The present disclosure also relates to an antenna connector arrangement 4 adapted to connect an antenna device 3 to a transmitter branch 5 and to a receiver branch 6 of a radio transceiver 2, where the transmitter branch 5 and the receiver branch 6 are adapted for transmitting and receiving, respectively, radio signals via the antenna device 3. The antenna connector arrangement 4 comprises a first tuneable band-stop filter 7, 7', a second tuneable band-stop filter 8, 8' and a three-way-junction 9, 9', where the first tuneable band-stop filter 7, 7' is connected to the transmitter branch 5 and to a transmitter input port 10, 10' of the three-way-junction 9, 9' to filter radio signals, and where the second tuneable band-stop filter 8, 8' is connected to the receiver branch 6 and a receiver output port 11, 11' of the three-way-junction 9, 9' to filter radio signals, where the three-way-junction 9, 9' comprises a first antenna port 12, 12' that is connected to the antenna device 3.

According to an example, each of the first tuneable band-stop filter 7 and second tuneable band-stop filter 8 comprises only one filter pole.

According to an example, the first tuneable band-stop filter 7 is adapted to suppress radio signals within a first frequency band $f_1$ corresponding to a frequency band of radio signals received via the receiver branch 6, and wherein the second tuneable band-stop filter 8 is adapted to suppress radio signals within a fourth frequency band $f_4$ corresponding to a frequency band of radio signals transmitted via the transmitter branch 5.

According to an example, the first tuneable band-stop filter 7 is adapted to suppress radio signals within the first frequency band $f_1$ by a suppression in a first suppression range between 15 dB and 25 dB, and wherein the second tuneable band-stop filter 8 is adapted to suppress radio signals within the fourth frequency band $f_4$ by a suppression in a second suppression range between 15 dB and 25 dB.

According to an example, signals within the first frequency band $f_1$ are arranged to be input to the second tuneable band-stop filter 8 from the three-way-junction 9, 9', and wherein signals within the fourth frequency band $f_4$ are arranged to be input to the three-way-junction 9, 9' from the first tuneable band-stop filter 7.

According to an example, the first tuneable band-stop filter 7 and the second tuneable band-stop filter 8 are constituted by electrically tuneable band-stop filters 7, 8.

According to an example, the three-way-junction is constituted by a circulator 9.

The present disclosure also relates to an antenna arrangement 36 comprising an antenna device 3 and an antenna connector arrangement 4, where the antenna connector arrangement is adapted to connect an antenna device 3 to a transmitter branch 5 and a receiver branch 6 of a radio transceiver 2, where the transmitter branch 5 and the receiver branch 6 are adapted for transmitting and receiving, respectively, radio signals via the antenna device 3. The antenna connector arrangement 4 comprises a first tuneable band-stop filter 7, 7', a second tuneable band-stop filter 8, 8' and a three-way-junction 9, 9', where the first tuneable band-stop filter 7, 7' is connected to the transmitter branch 5 and to a transmitter input port 10, 10' of the three-way-junction 9, 9' to filter radio signals, and where the second tuneable band-stop filter 8 is connected to the receiver branch 6 and a receiver output port 11, 11' of the three-way-junction 9, 9' to filter radio signals, where the three-way-junction 9, 9' comprises a first antenna port 12, 12' that is connected to said antenna device 3.

According to an example, each of the first tuneable band-stop filter 7 and second tuneable band-stop filter 8 comprises only one filter pole.

According to an example, the first tuneable band-stop filter 7 is adapted to suppress radio signals within a first frequency band $f_1$ corresponding to a frequency band of radio signals received via the receiver branch 6, and wherein the second tuneable band-stop filter 8 is adapted to suppress radio signals within a fourth frequency band $f_4$ corresponding to a frequency band of radio signals transmitted via the transmitter branch 5.

According to an example, the first tuneable band-stop filter 7 is adapted to suppress radio signals within the first frequency band $f_1$ by a suppression in a first suppression range between 15 dB and 25 dB, and wherein the second tuneable band-stop filter 8 is adapted to suppress radio signals within the fourth frequency band $f_4$ by a suppression in a second suppression range between 15 dB and 25 dB.

According to an example, signals within the first frequency band $f_1$ are arranged to be input to the second tuneable band-stop filter 8 from the circulator 9, and wherein signals within the fourth frequency band $f_4$ are arranged to be input to the circulator 9 from the first tuneable band-stop filter 7.

According to an example, the first tuneable band-stop filter 7 and the second tuneable band-stop filter 8 are constituted by electrically tuneable band-stop filters 7, 8.

According to an example, the antenna device 3 comprises a directive antenna.

According to an example, the antenna device 3 comprises a microwave radio-link antenna.

According to an example, the three-way-junction is constituted by a circulator 9.

The present disclosure also relates to an electrically tuneable waveguide band-stop filter arrangement 42 comprising a first waveguide part 37 running along a longitudinal extension L and at least one second waveguide part 38 that is connected to the first waveguide part 37 along its longitudinal extension L at a waveguide connection 39, where said second waveguide part 38 runs parallel to the extension of an electrical field E of the first waveguide part 37 and ends in a short-circuit 40 a certain distance d from the waveguide connection 39. Said second waveguide part 38 comprises an aperture 41, where the band-stop filter arrangement 42 further comprises a dielectric part 43 and an electric motor 44, where the dielectric part 43 is arranged to enter said second waveguide part 38 via the aperture 41, and where the electric motor 44 is arranged to move the dielectric part 43 within said second waveguide part 38 via the aperture 41.

According to an example, said second waveguide part 38 is electrically connected to the first waveguide part 37 along its longitudinal extension L at the waveguide connection 39.

According to an example, the electric motor 44 comprises a control connection 48 that is adapted to enable tuning of the filter characteristics of the band-stop filter arrangement 42.

According to an example, the electric motor 44 is constituted by a step-motor that is arranged to move the dielectric part 43 within said second waveguide part 38 along an adjustment axis 49 by means of a screw rod 50 that runs along the adjustment axis 49.

The invention claimed is:

1. A radio system comprising:
a radio transceiver,
an antenna device and
an antenna connector arrangement,
where the radio transceiver comprises a transmitter branch and a receiver branch for transmitting and receiving, respectively, radio signals via the antenna device, and
where the antenna connector arrangement connects the antenna device to the transmitter branch and to the receiver branch,
wherein the antenna connector arrangement comprises:
a first tuneable band-stop filter,
a second tuneable band-stop filter and
a three-way-junction,
where the first tuneable band-stop filter is connected to the transmitter branch and a transmitter input port of the three-way-junction to filter radio signals, and
where the second tuneable band-stop filter is connected to the receiver branch and a receiver output port of the three-way-junction to filter radio signals,
where the three-way-junction comprises a first antenna port that is connected to the antenna device.

2. The radio system according to claim 1, wherein each of the first tuneable band-stop filter and the second tuneable band-stop filter comprises only one filter pole.

3. The radio system according to claim 1, wherein:
the first tuneable band-stop filter is adapted to suppress radio signals within a first frequency band corresponding to a frequency band of radio signals received via the receiver branch, and
the second tuneable band-stop filter is adapted to suppress radio signals within a fourth frequency band corresponding to a frequency band of radio signals transmitted via the transmitter branch.

4. The radio system according to claim 3, wherein:
the first tuneable band-stop filter is adapted to suppress radio signals within the first frequency band by a suppression in a first suppression range between 15 dB and 25 dB, and the second tuneable band-stop filter is adapted to suppress radio signals within the fourth frequency band by a suppression in a second suppression range between 15 dB and 25 dB.

5. The radio system according to claim 1, wherein the receiver branch comprises:
a first amplifier arrangement,
a second oscillator,
a second mixer,
a receiver filter and
an analogue to digital converter, ADC,
where the first amplifier arrangement is arranged to amplify a received first analogue signal at the first frequency band that is input from the second tuneable band-stop filter,
where the second mixer is arranged to shift the amplified first analogue signal down in frequency to a second analogue signal within a second frequency band, and
where the first ADC is arranged to convert the second analogue signal to a received first digital signal,
where the receiver branch further comprises a signal subtractor connected to the first ADC.

6. The radio system according to claim 5, wherein the transmitter branch comprises:
a digital to analogue converter, DAC,
a first oscillator connected to a first mixer and a second amplifier arrangement that in turn is connected to a coupler,
where the DAC is arranged to convert an input second digital signal to a third analogue signal within a third frequency band, and
where the first mixer is arranged to shift the third analogue signal up in frequency to a fourth analogue signal within a fourth frequency band.

7. The radio system according to claim 6, wherein the coupler is arranged to feed a first coupled signal within the fourth frequency band that is constituted by a fraction of the fourth analogue signal to an interference cancellation arrangement comprised in the radio transceiver.

8. The radio system according to claim 7, wherein the interference cancellation arrangement comprises:
a third mixer that is arranged to shift the first coupled signal down in frequency to a second coupled signal within the third frequency band,
an anti-aliasing filter,
a second analogue to digital converter, ADC, and
a digital signal processor, DSP,
where the ADC is arranged to convert the filtered second coupled signal to a digital coupled signal, and
where the DSP and the signal subtractor are arranged to subtract the digital coupled signal from the received first digital signal.

9. The radio system according to claim 1, wherein the radio transceiver is in the form of a homodyne radio transceiver.

10. The radio system according to claim 1, wherein the first tuneable band-stop filter and the second tuneable band-stop filter are constituted by electrically tuneable band-stop filters.

11. The radio system according to claim 1, wherein the antenna device comprises a directive antenna.

12. The radio system according to claim 1, wherein the antenna device comprises a microwave radio-link antenna.

13. The radio system according to claim 1, wherein the three-way-junction is constituted by a circulator.

14. An antenna connector arrangement configured to:
connect an antenna device to a transmitter branch and to a receiver branch of a radio transceiver,
where the transmitter branch and the receiver branch are adapted for transmitting and receiving, respectively, radio signals via the antenna device,
wherein the antenna connector arrangement comprises:
a first tuneable band-stop filter,
a second tuneable band-stop filter and
a three-way-junction,
where the first tuneable band-stop filter is connected to the transmitter branch and to a transmitter input port of the three-way-junction to filter radio signals, and
where the second tuneable band-stop filter is connected to the receiver branch and a receiver output port of the three-way-junction to filter radio signals,
where the three-way-junction comprises a first antenna port that is connected to the antenna device.

15. The antenna connector arrangement according to claim 14, wherein each of the first tuneable band-stop filter and second tuneable band-stop filter comprises only one filter pole.

16. The antenna connector arrangement according to claim 14, wherein:
the first tuneable band-stop filter is adapted to suppress radio signals within a first frequency band corresponding to a frequency band of radio signals received via the receiver branch, and
the second tuneable band-stop filter is adapted to suppress radio signals within a fourth frequency band corresponding to a frequency band of radio signals transmitted via the transmitter branch.

17. The antenna connector arrangement according to claim 16, wherein:
the first tuneable band-stop filter is adapted to suppress radio signals within the first frequency band by a suppression in a first suppression range between 15 dB and 25 dB, and
the second tuneable band-stop filter is adapted to suppress radio signals within the fourth frequency band by a suppression in a second suppression range between 15 dB and 25 dB.

18. The antenna connector arrangement according to claim 14, wherein:
signals within the first frequency band are arranged to be input to the second tuneable band-stop filter from the three-way-junction, and
signals within the fourth frequency band are arranged to be input to the three-way-junction from the first tuneable band-stop filter.

19. The antenna connector arrangement according to claim 14, wherein the first tuneable band-stop filter and the second tuneable band-stop filter are constituted by electrically tuneable band-stop filters.

20. The antenna connector arrangement according to claim 14, wherein the three-way-junction is constituted by a circulator.

21. An antenna arrangement comprising:
an antenna device and
an antenna connector arrangement,
where the antenna connector arrangement is adapted to connect an antenna device to a transmitter branch and a receiver branch of a radio transceiver,
where the transmitter branch and the receiver branch are adapted for transmitting and receiving, respectively, radio signals via the antenna device,
wherein the antenna connector arrangement comprises:
a first tuneable band-stop filter,
a second tuneable band-stop filter and
a three-way-junction,
where the first tuneable band-stop filter is connected to the transmitter branch and to a transmitter input port of the three-way-junction to filter radio signals, and
where the second tuneable band-stop filter is connected to the receiver branch and a receiver output port of the three-way-junction to filter radio signals,
where the three-way-junction comprises a first antenna port that is connected to said antenna device.

22. The antenna arrangement according to claim 21, wherein each of the first tuneable band-stop filter and second tuneable band-stop filter comprises only one filter pole.

23. The antenna arrangement according to claim 21, wherein:
the first tuneable band-stop filter is adapted to suppress radio signals within a first frequency band corresponding to a frequency band of radio signals received via the receiver branch, and
the second tuneable band-stop filter is adapted to suppress radio signals within a fourth frequency band corresponding to a frequency band of radio signals transmitted via the transmitter branch.

24. The antenna arrangement according to claim 23, wherein:
the first tuneable band-stop filter is adapted to suppress radio signals within the first frequency band by a suppression in a first suppression range between 15 dB and 25 dB, and
the second tuneable band-stop filter is adapted to suppress radio signals within the fourth frequency band by a suppression in a second suppression range between 15 dB and 25 dB.

25. The antenna arrangement according to claim 21, wherein:
signals within the first frequency band are arranged to be input to the second tuneable band-stop filter from the circulator, and
signals within the fourth frequency band are arranged to be input to the circulator from the first tuneable band-stop filter.

26. The antenna arrangement according to claim 21, wherein the first tuneable band-stop filter and the second tuneable band-stop filter are constituted by electrically tuneable band-stop filters.

27. The antenna arrangement according to claim 21, wherein the antenna device comprises a directive antenna.

28. The antenna arrangement according to claim 21, wherein the antenna device comprises a microwave radio-link antenna.

29. The antenna arrangement according to claim 21, wherein the three-way-junction is constituted by a circulator.

* * * * *